United States Patent Office 3,552,145
Patented Jan. 5, 1971

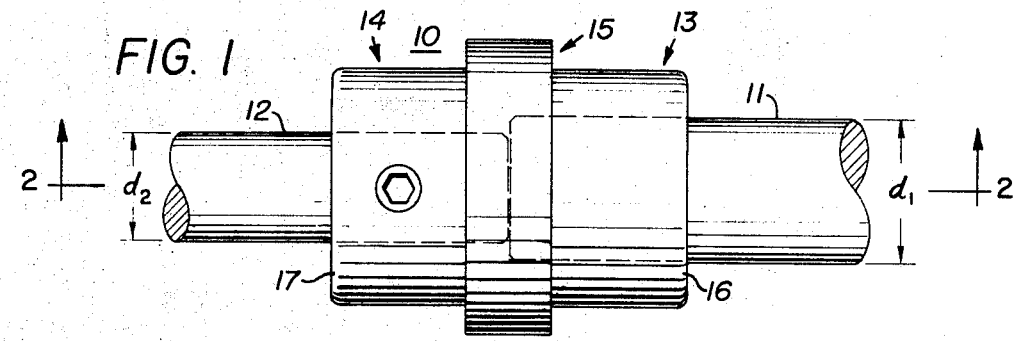
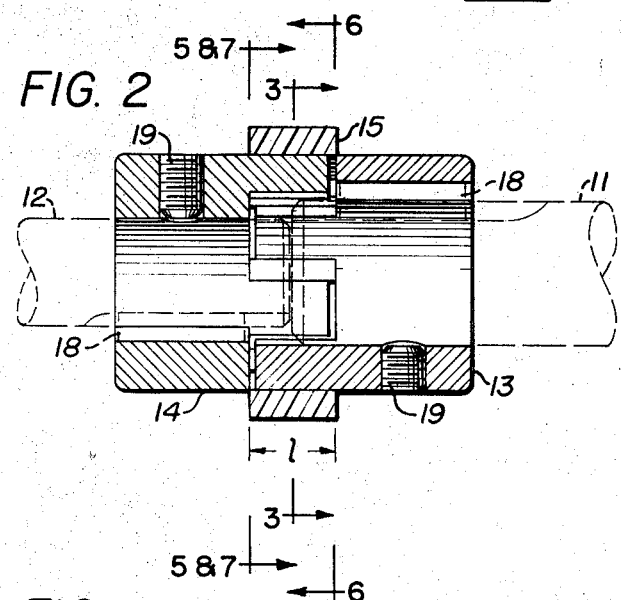
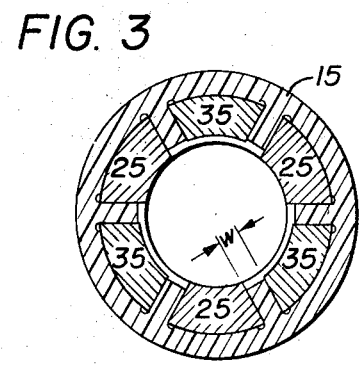
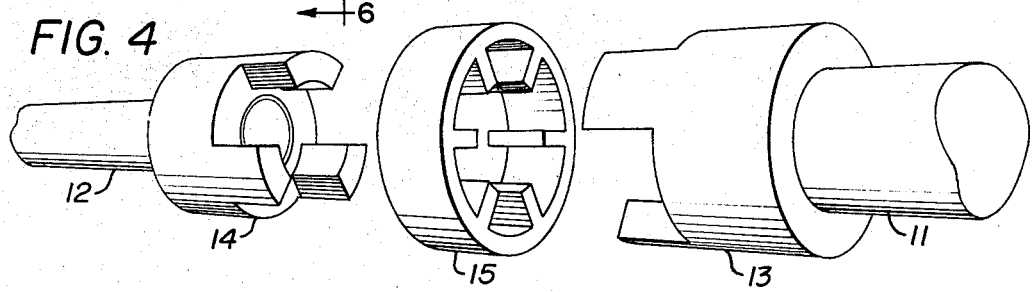
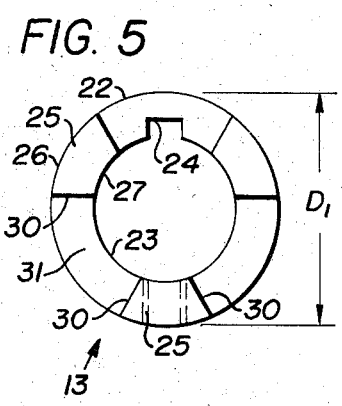
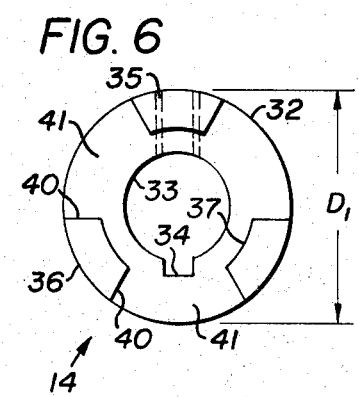
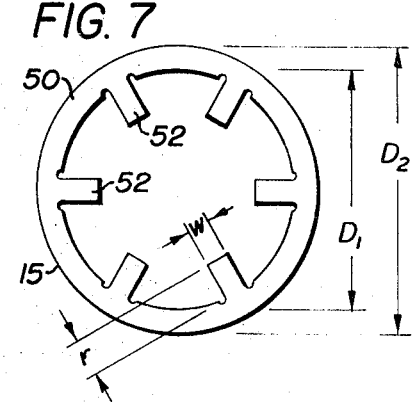

---

3,552,145
FLEXIBLE SHAFT COUPLING
Forrest A. Barton, Rockland, and Stratis George Belezos, Canton, Mass., assignors to North American Rockwell Corporation, Pittsburgh, Pa., a corporation of Delaware
Filed July 31, 1968, Ser. No. 749,096
Int. Cl. F16d 3/12, 3/64
U.S. Cl. 64—14
3 Claims

ABSTRACT OF THE DISCLOSURE

A flexible shaft coupling including a pair of rigid elements having axially extending interdigitated lugs and a flexible resilient one-piece element interposed between the rigid elements for transmitting torque therebetween, the flexible element including an annular ring surrounding the lugs and a plurality of fingers formed integrally with the ring and projecting radially inwardly therefrom between adjacent ones of the lugs.

---

This invention relates to flexible shaft couplings and, more particularly, to an improved and simple flexible coupling that can be easily and rapidly assembled with minimum alignment difficulties. The invention further relates to a flexible coupling capable of effective torque transmission with minimum dimensions axially and radially.

Couplings are often used to axially interconnect independently mounted shafts such that the shafts will rotate in unison. For example, couplings are widely used to connect a driving shaft, such as the shaft of an electric motor, to a driven shaft, such as the input shaft to a gear box. If the independently mounted shafts are aligned axially such that all are restrained by their bearings to rotation about an identical axis, the couplings may take on practically any form since the only requirement in such a case is that the shafts be held against rotation relative to each other. In particular, it would be quite satisfactory in such a case to rigidly interconnect the shafts. In practice, however, it is extremely difficult to achieve such precise alignment between the shafts, there ordinarily being slight misalignments between the axes of the adjacent shaft components. In such cases, rigid couplings can cause excessive stresses in the shafts due to bending, excessive side loads on the bearings, excessive noise, and other undesirable operating characteristics. For these reasons, flexible couplings are most often used in practice to connect shaft components into an integral shaft assembly.

Flexible couplings having a wide variety of forms are available in the marketplace. These prior art arrangements are not, however, entirely satisfactory for a number of reasons. Some arrangements are quite bulky, increasing the axial length of the composite shaft substantially or requiring excessive diameter in order to provide sufficient torque transmission capability. Such arrangements are, of course, undesirable where the space available around the shaft is limited or it is desired to closely couple the driving and driven shafts. For example, these arrangements are unsuitable for use where it is desired to connect a motor and a gear-box in the shortest possible axial distance. Other typical arrangements are relatively expensive and complex, often requiring extreme care during assembly to assure that the shafts and the various components comprising the coupling are properly aligned and connected.

It is, therefore, an object of this invention to provide an improved flexible shaft coupling that is simple and easy to assemble.

Another object is to provide a flexible coupling that is not only relatively simple and inexpensive, but also provides an axially and radially compact assembly.

Yet another object is to provide an improved flexible shaft coupling that permits extremely close coupling of the connected shafts.

Briefly stated, in carrying out the invention in one form, a flexible coupling includes a pair of rigid elements mounted for rotation about substantially identical axes, the rigid elements each including a plurality of equally angularly spaced identical lugs projecting axially toward the other rigid element into interdigitated relation with the lugs of the other element. The angular extent of the spaces between the lugs of each of the rigid elements is substantially greater than the respective lugs of the other of the rigid elements so that the interdigitated lugs are angularly spaced-apart. To accommodate slight misalignments between the axes of the rigid members, a one-piece flexible resilient element is disposed between the rigid elements for transmitting torque therebetween without direct contact between the rigid elements. This flexible element includes a continuous annular ring portion surrounding the interdigitated lugs and a plurality of finger portions formed integrally with the ring portion and projecting radially inward from the ring portion to resiliently fill the spaces between adjacent pairs of the lugs.

By a further aspect of the invention, the radially inner ends of the fingers are unsupported, and both the fingers and the lugs extend radially inward to inner dimensions large enough to permit input shafts received in bores in the rigid elements to project axially into the space radially inwardly of the interdigitated lugs. This permits the coupling to be highly compact, a particularly advantageous characteristic for use in gear motor assemblies in which an electric motor and a gear-box are combined into an integral assembly. By a still further aspect of the invention, the ring portion of the flexible resilient element has sufficient radial thickness and strength to maintain substantially its initial configuration during high speed rotation.

While the invention is distinctly claimed and particularly pointed out in the claims appended hereto, the invention, both as to organization and content, will be better understood and appreciated, along with other objects and features thereof, from the following detailed description when taken in conjunction with the drawing, in which:

FIG. 1 is a side view of a shaft coupling formed in accordance with the invention, the coupling interconnecting a pair of shafts of different diameters;

FIG. 2 is a cross-sectional view of the coupling taken along viewing line 2—2 of FIG. 1;

FIG. 3 is a cross-sectional view of the coupling taken along viewing line 3—3 of FIG. 2;

FIG. 4 is an exploded view of the coupling with the shafts retracted to better illustrate the lug arrangements of the rigid elements;

FIG. 5 is a view of one of the rigid elements of the coupling taken along viewing line 5—5 of FIG. 2;

FIG. 6 is a view of the other of the rigid elements of the coupling taken along viewing line 6—6 of FIG. 2; and FIG. 7 is a view of the flexible element of the coupling taken along viewing line 7—7 of FIG. 2.

Referring first to FIGS. 1–3, a flexible shaft coupling 10 incorporating the present invention is illustrated, the coupling 10 interconnecting a shaft 11 having a diameter $d_1$ and a shaft 12 having a diameter $d_2$ smaller than $d_1$. The coupling 10 includes a pair of rigid elements 13 and 14 and a flexible resilient element 15 between the rigid elements for positively transmitting torque therebetween. The rigid elements 13 and 14 include hub portions 16 and 17, respectively, secured to the shafts 11 and 12 in fixed positions by keys 18 and set screws 19. With the flexible element 15 positively transmitting torque between the rigid elements 13 and 14 and the rigid elements fixed to the shafts 11 and 12, forced rotation of one of the shafts, as by an electric motor, causes the entire assembly including the coupling 10 and the shafts 11 and 12 to rotate in unison as an integral structure.

To appreciate the manner in which torque is transmitted between the rigid elements 13 and 14, it is necessary to understand the construction of the elements comprising the coupling 10. Accordingly, with reference to FIGS. 2, 4, and 5, the rigid element 13 will be described. The hub 16 of this element has an outer cylindrical surface 22 having a diameter $D_1$ and a coaxial bore 23 therein for receiving the shaft 11. The bore 23, which has an axially extending key-way 24 therein for receiving the associated key 18, has a diameter just sufficient to receive the shaft 11, approximately $d_1$. Three lugs 25 project axially from the hub 16, the lugs 25 being equally angularly spaced about the axis of the element 13. As best shown by FIGS. 2 and 5, the lugs 25 have arcuate outer surfaces 26 which are axial extensions of the outer surface 22 of the hub 16 and arcuate inner surfaces 27 which are axial extensions of the bore 23. Since the lugs 25 do not project radially inward of the bore 23, it will be clear that, if desired, the shaft 11 can project through the bore 23 into the space radially inward of the lugs 25. Continuing now with the discussion of the lugs 25, the outer and inner surfaces 26 and 27 are interconnected by planar surfaces 30 which converge in the radially inward direction. With reference to FIG. 5, it will be noted that the lugs 25 all have equal angular extents with respect to the axis of the element 13 and that the spaces 31 between the lugs 25 all have equal angular extents of the spaces 31 being greater than the angular extents of the lugs 25. The reason for this will become obvious as this description proceeds.

Referring now to FIGS. 2, 4, and 6, the hub 17 of the rigid element 14 similarly has an outer cylindrical surface 32 having a diameter $D_1$ and a coaxial bore 33 therein for receiving the shaft 12. The bore 33, which has an axially extending key-way 34 therein for receiving the associated key 18, has a diameter just sufficient to receive the shaft 12, approximately $d_2$. These lugs 35 project axially from the hub 17, the lugs 35 being equally angularly spaced about the axis of the element 14. The lugs 35 have arcuate outer surfaces 36 which are axial extensions of the outer surface 32 and arcuate inner surfaces 37 which have a larger diameter than the bore 33. As best shown by FIG. 3, the arcuate inner surfaces 37 are preferably formed on a radius slightly larger than that of the inner surfaces 27 of the lugs 25 for reasons which will soon become obvious. Referring now to FIG. 6, it will be noted that the outer and inner surfaces 36 and 37 are interconnected by planar surfaces 40 which converge in the radially inward direction. The lugs 35 all have equal angular extents with respect to the axis of the element 14 and the spaces 41 between the lugs 35 all have equal angular extents, the angular extents of the spaces 41 being greater than the angular extents of the lugs 35.

Turning now to FIGS. 2 and 3, it will be seen that the elements 13 and 14 are assembled such that the lugs 25 and 35 axially overlap in alternating or interdigitated relationship. In accordance with the preferred form of the invention, the lugs 25 and 35 are all identical so that, when overlapped spaces are formed between the adjacent planar surfaces 30 and 40 of each adjacent pair of lugs 25 and 35. The convergence of the planar surfaces 30 and 40 is selected such that the adjacent surfaces are parallel and the spaces between ahave constant width $w$.

As best illustrated by FIGS. 2, 4, and 7, the flexible resilient element 15 is a simple one-piece member including an annular ring portion 50 haivng a length $l$ slightly greater than the length of the lugs 25 and 35, an internal diameter approximately equal to the diameter $D_1$ of the elements 13 and 14, and an outer diameter $D_2$. A plurality of fingers 52 are formed integrally with the ring portion 50 and project radially inwardly therefrom, the fingers 52 having a thickness approximately equal to the width $w$ of the spaces between adjacent one of the planar surfaces 30 and 40 and a radial length $r$ approximately equal to the radial overlap of the lugs 25 and 35. In number, there are as many equally angularly spaced fingers 52 as there are spaces between the lugs, this being equal to the total number of lugs 25 and 35, or six in the illustrated embodiment.

To assemble the coupling 10, the elements 13, 14, and 15 are axially arranged as illustrated by FIG. 4 with the flexible element 15 axially interposed between the rigid elements 13 and 14 and angularly arranged as illustrated by FIG. 3. The elements are then moved axially into the interdigitated relationship illustrated by FIGS. 2 and 3 with the fingers 52 interposed between adjacent pairs of lugs 25 and 35 to prevent metal-to-metal contact therebetween. Since the length $l$ of the element 15 is greater than that of the lugs 25 and 35, the fingers 52 also prevent metal-to-metal contact between the ends of the lugs 25 and 35 and the other of the rigid elements 13 and 14. Since the lugs 25 and 35 and the fingers 52 do not extend radially inwardly of the larger bore 23, either or both of the shafts 11 and 12 can project axially into the space inwardly of the interdigitated lugs into proximity with each other to provide a minimum length coupling. By making the radius of the inner surfaces 37 of the lugs 35 slightly larger than the surfaces 27 of the lugs 25, the larger diameter shaft 11 can "wiggle" slightly within the space inwardly of the lugs without contacting the lugs 35 rotating on the axis of the other shaft 12. Furthermore, since the fingers 52 are unsupported at their radially inner ends and both the lugs 25 and 35 and the fingers 52 extend radially inward to the bore 23, maximum torque transmission bearing area may be achieved with a relatively small outer diameter $D_2$ of the coupling 10. The coupling 10 is thus particularly adapted for use where radial clearances are limited. It should be particularly noted that the one-piece element 15 has no parts which must be individually assembled and that alignment problems are minimized since the lugs 25 and 35 and the fingers 52 can be arranged in any order since all elements are angularly symmetrical.

Approximate dimensions have been used above to describe the flexible element 15. In practice, the internal diameter of the ring portion 50 should be small enough to closely mate with the outer surfaces 26 and 36 of the interdigitated lugs 25 and 35, and the fingers 52 should be thick enough to closely mate with the planar side surfaces 30 and 40 of the lugs. In this manner, torque transmission will be accomplished smoothly without objectionable vibration. The diameter $D_2$ of the ring portion 50 should be large enough to provide sufficient ring thickness and strength to maintain the initial configuration of the ring portion 50 during high speed rotation of the coupling 10.

The flexible element 15 should, in addition to being flexible and resilient, be tough and durable. It has been found that a specially compounded polyurethane is a particularly desirable material for this element. Other acceptable materials will, of course, be obvious to those skilled in the art.

Various modifications of the coupling 10 of this invention will be apparent to those skilled in the art. For example, the lugs on one of the rigid elements could have larger angular extents than the lugs on the other rigid element. It is, however, a requirement in this respect that the angular extent of the spaces between the lugs on each rigid element be larger than the angular extent of the lugs on the other rigid element so that the lugs may be assembled into their interdigitated relationship. Similarly, if axial compactness is not required, the lugs may extend radially inward of the bores in the hubs. The coupling may, of course, be used to interconnect shafts having the same diameter as well as shafts of different diameters. Similarly, it will be appreciated that one or more of the rigid elements may be formed integrally with its associated shaft.

From the foregoing, it will be appreciated that the invention provides an improved flexible shaft coupling that is simple and easy to assemble between a pair of essentially coaxial shafts. The coupling of this invention is also compact both radially and axially due to the unique configuration of the elements.

While a preferred embodiment of the invention has been illustrated and described above, it will be understood that various changes and modifications may be made without departing from the spirit and scope of the invention, and it is intended to cover all such changes and modifications by the appended claims.

What is claimed as new and is desired to secure by Letters Patent:

1. A flexible coupling comprising a first rigid element mounted for rotation on a first rotatable shaft; a second rigid element mounted adjacent said first rigid element for rotation on a second rotatable shaft; said second rotatable shaft being substantially coaxial with said first rotatable shaft, the diameter of one rotatable shaft being greater than the diameter of the other rotatable shaft; said first rigid element including a hub portion from which a plurality of equally angularly spaced, identical torque-transmitting lugs axially project toward said second rigid element; and said second rigid element including a hub portion from which an equal plurality of equally angularly spaced, identical, torque-transmitting lugs axially project toward said first rigid element into axially overlapping, interdigitated relation with the lugs of said first rigid element, said hub portions of said first and second rigid elements having coaxial bores therein for receiving said first and second rotatable shafts, the angular extent of said lugs being equal and the angular extent of the spaces between the lugs of each of said rigid elements being substantially greater than the angular extent of the respective lugs of the other of said rigid elements such that adjacent ones of said interdigitated lugs are angularly spaced-apart, said lugs have identical arcuate outer surfaces and arcuate inner surfaces of a diameter at least equal to the diameter of the bore receiving the larger diameter rotatable shaft such that said rotatable shafts may project axially into the space radially inwardly of said interdigitated lugs, whereby the overall axial length of said flexible coupling is substantially reduced; a one-piece flexible resilient element disposed between said rigid elements for transmitting torque therebetween without direct contact between said rigid elements and for accommodating slight static and dynamic radial and axial misalignment of said first and second rotatable shafts as well as accommodating slight static axial movement of each of said first and second rigid elements with respect to said first and second rotatable shafts, said flexible resilient element including a continuous annular ring portion surrounding said interdigitated lugs and a plurality of equally angularly spaced finger portions formed integrally with said ring portion and extending radially inward therefrom into the spaces between said interdigitated lugs, said finger portions being equal in number to the total number of lugs on said first and second rigid elements so that no two adjacent lugs can contact each other, said finger portions being supported only at their radially outer ends at said ring portion and the axial extent of said ring portion and said finger portions is slightly greater than the axial overlap of said lugs, and in which the radial extent of said finger portions is substantially equal to the radial overlap of said lugs.

2. A flexible coupling as defined by claim 1 in which said ring portion has sufficient radial thickness and strength to maintain its initial configuration during high speed rotation.

3. A flexible coupling as defined by claim 1 wherein said inner and outer arcuate surfaces of each lug are joined by planar axially extending side surfaces converging in the radially inward direction, said ring portion having identical arcuate inner surfaces intermediate said finger portions sized to closely mate with the arcuate outer surfaces of said lugs, and said finger portions being shaped to closely mate with the facing side surfaces of adjacent lugs.

References Cited
UNITED STATES PATENTS

| | | | |
|---|---|---|---|
| 2,655,798 | 10/1953 | Neher | 64—14 |
| 2,692,485 | 10/1954 | Brierley | 64—14 |
| 2,891,395 | 6/1959 | Chater | 64—14 |
| 2,996,900 | 8/1961 | Fermier | 64—14 |
| 3,355,910 | 12/1967 | Pruner | 64—14 |
| 3,410,112 | 11/1968 | Gawreliuk | 64—14 |

JAMES A. WONG, Primary Examiner

U.S. Cl. X.R.

64—27

PO-1050
(5/69)

UNITED STATES PATENT OFFICE
CERTIFICATE OF CORRECTION

Patent No. 3,552,145                    Dated   January 5, 1971

Inventor(s) FORREST A. BARTON and STRATIS GEORGE BELEZOS

It is certified that error appears in the above-identified patent and that said Letters Patent are hereby corrected as shown below:

Column 3, line 33, after "extents" insert -- , the angular extents --;

Column 3, line 43, change "These" to -- Three --.

Signed and sealed this 13th day of April 1971.

(SEAL)
Attest:

EDWARD M. FLETCHER, JR.            WILLIAM E. SCHUYLER, JR.
Attesting Officer                  Commissioner of Patents